United States Patent

[11] 3,610,913

| [72] | Inventor | Kenneth Bowen |
| | | London, England |
| [21] | Appl. No. | 828,687 |
| [22] | Filed | May 28, 1969 |
| [45] | Patented | Oct. 5, 1971 |
| [73] | Assignee | Bowens Sales & Service Limited |
| [32] | Priority | Sept. 27, 1968 |
| [33] | | Great Britain |
| [31] | | 46058/68 |

[54] PHOTOGRAPHIC FLASH APPARATUS
3 Claims, 1 Drawing Fig.

[52] U.S. Cl. .................................................. 240/1.3
[51] Int. Cl. ............................................. G03b 15/02
[50] Field of Search .......................................... 240/1.3;
95/11 L

[56] References Cited
FOREIGN PATENTS 728,790   4/1955   Great Britain ................ 240/1.3

*Primary Examiner*—Donald O. Woodiel
*Attorney*—Watson, Cole, Grindle & Watson

ABSTRACT: Electronic flash apparatus of generally ring flash form, comprising annular reflector means divided into successive reflector compartments in the circumferential sense, each compartment mounting a respective flash discharge tube therein controlled by respective selectively operable switch means therefor.

PATENTED OCT 5 1971 3,610,913
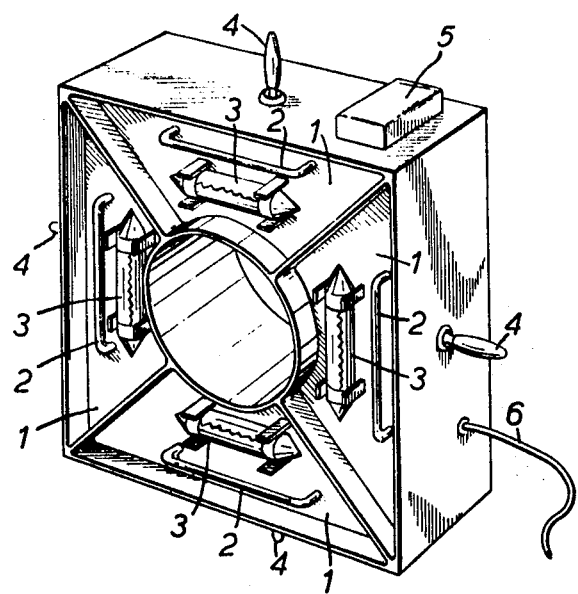
INVENTOR
Kenneth Bowen
BY
Watson, Cole, Grindle + Watson
ATTORNEYS

PHOTOGRAPHIC FLASH APPARATUS

This invention concerns photographic flash apparatus, and more particularly electronic flash apparatus of so-called "ring flash" form.

Ring flash apparatus, as the term implies, comprises a flash discharge tube in the form of a ring and mounted in an annular reflector. The advantages of such an arrangement is that the reflector/tube ring can be disposed around a camera objective to provide a flash source close to the optical axis and uniformly distributed therearound, this being especially useful in circumstances where short ranges are involved. However, the resultant lighting is flat and this is disadvantageous if the subject involves variation in depth or what can be termed texture.

An object of the present invention is to resolve this difficulty and, to this end, provides electronic flash apparatus of generally ring flash form but comprising annular reflector means divided into successive reflector compartments in the circumferential sense, each compartment mounting a respective flash discharge tube therein controlled by respective selectively operable switch means therefor.

Thus, the switch means can be selectively operated such that all or some of the flash tubes are subject to simultaneous discharge upon operation of a camera, so enabling a photographer to employ a complete ring or part-ring flash. Putting this another way, a photographer is enabled to select whole ring flash, or top, side top and side, and so on part-ring flash, while still having the flash source located adjacent the relevant optical axis.

Preferably, each individual flash discharge tube is associated with a respective modelling lamp in its compartment, which lamp is energized when the corresponding switch is operated. This enables a photographer to judge which of the various possible part-ring and whole-ring lighting effects are best suited to his requirements.

For a clearer understanding of the present invention one embodiment of an electronic flash gun in accordance with it will be described in some detail schematically illustrated by way of example with reference to the accompanying perspective drawing.

The gun shown in the drawing is peripherally of shallow square box form with a circular cylindrical aperture axially therethrough. The resultant annulus is divided diagonally into four reflector compartments 1. In each compartment 1 there is mounted a flash discharge tube 2 adjacent and parallel to the respective side of the gun, and an associated modelling filament lamp 3 is mounted inwardly thereof and parallel thereto. A respective switch 4 extends from each side of the gun, each such switch serving in one position to disable the tube 2 and lamp 3 of the adjacent compartment, and in the other position to 'enable' the tube while energizing the lamp.

A neon indicator tube 5 is mounted on one side of the gun, a threaded mounting socket (not shown) is provided in the remote side of the gun, and a synchronizing connection lead 6 extends from another side of the gun. These last features are conventional as can be the associated electronic circuits.

It will of course be appreciated that the invention is not intended to be limited to the more specific features of the illustrated embodiment. For example, the number of compartments can be different and so also can the geometry since the term "ring" is clearly not used in sense of circular, but rather closed loop configuration.

I claim:

1. Electronic flash apparatus of generally ring flash form, comprising reflector means divided into successive reflector compartments, each compartment mounting a respective flash discharge tube therein controlled by respective selectively operable switch means thereof.

2. Apparatus according to claim 1, in which each individual flash discharge tube is associated with a respective modelling lamp in its compartment, which lamp is energized when the corresponding switch is operated to the associated discharge tube.

3. Apparatus according to claim 1, in which the reflector means is housed in a gun of shallow square box form with a circular cylindrical aperture axially therethrough, the resultant box form being divided diagonally into four reflector compartments.